Figure 1:
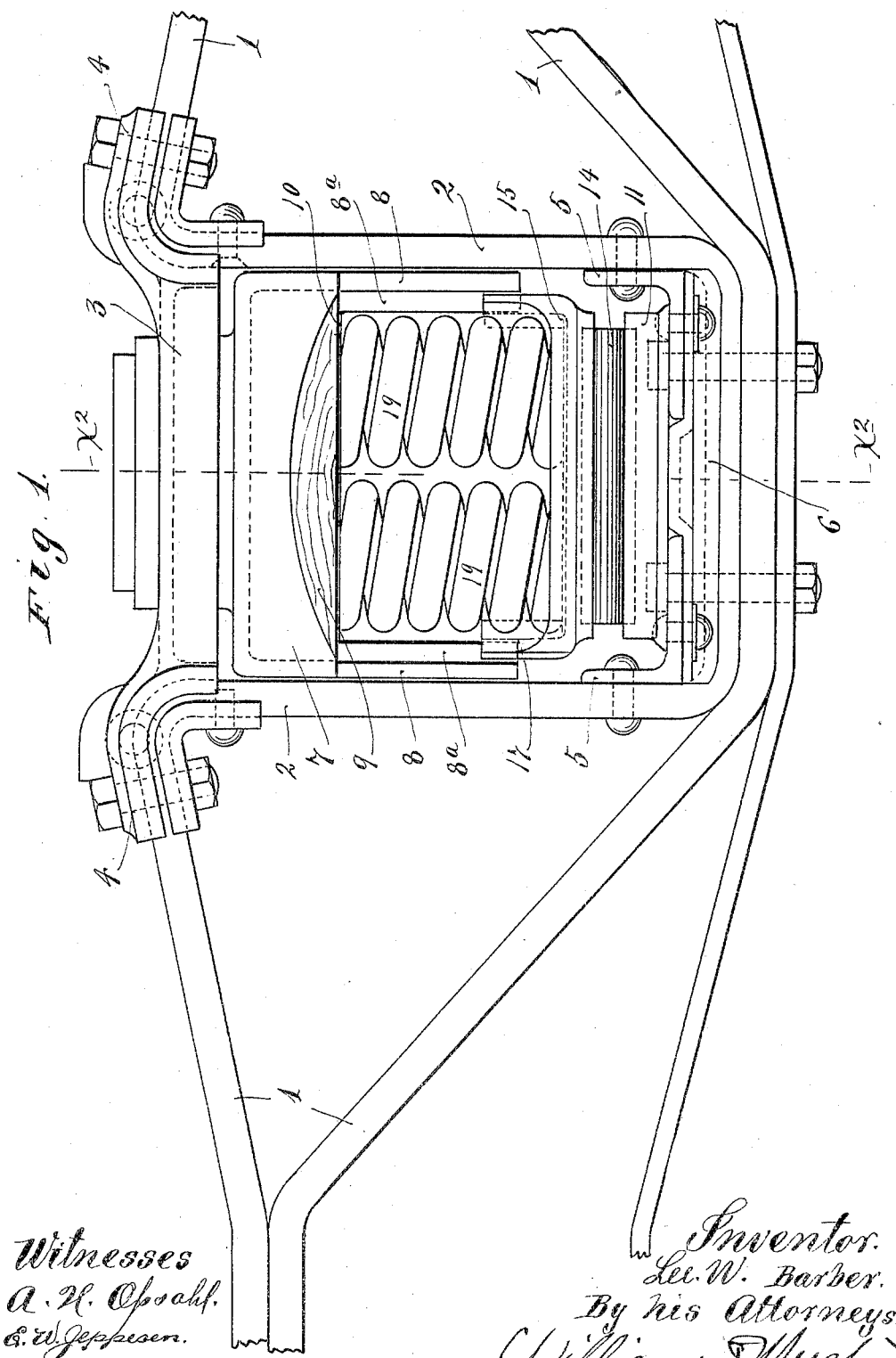

No. 784,096. PATENTED MAR. 7, 1905.
L. W. BARBER.
LATERAL MOTION DEVICE FOR CAR TRUCKS.
APPLICATION FILED OCT. 4, 1904.

3 SHEETS—SHEET 1.

Witnesses
A. H. Opsahl.
E. W. Jeppesen.

Inventor.
Lee W. Barber.
By his Attorneys
Williamson & Merchant

No. 784,096. PATENTED MAR. 7, 1905.
L. W. BARBER.
LATERAL MOTION DEVICE FOR CAR TRUCKS.
APPLICATION FILED OCT. 4, 1904.
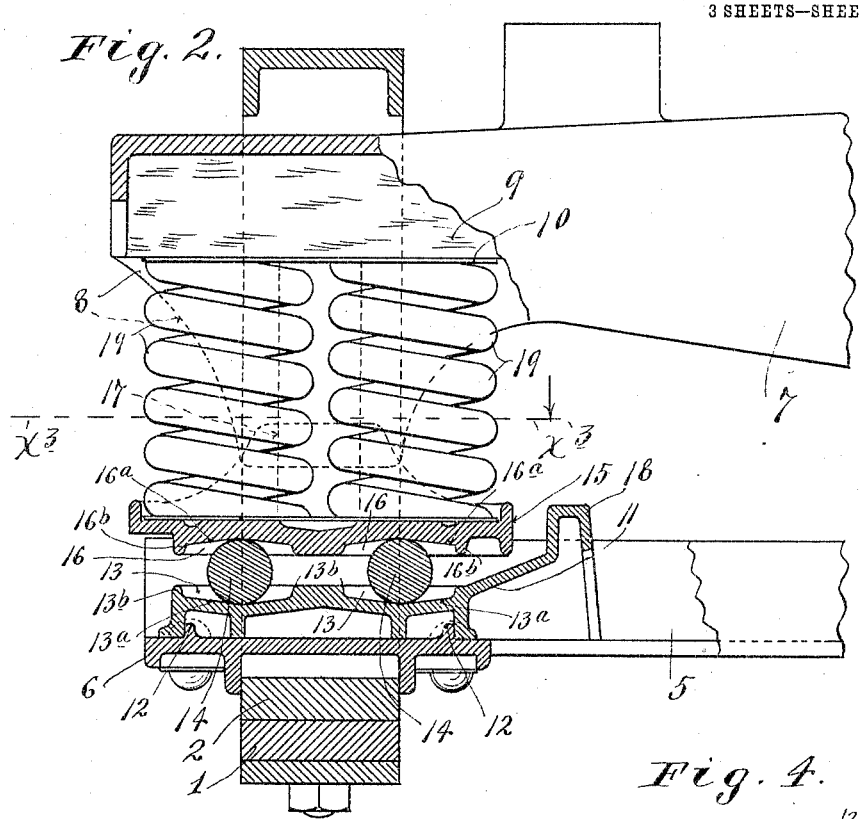
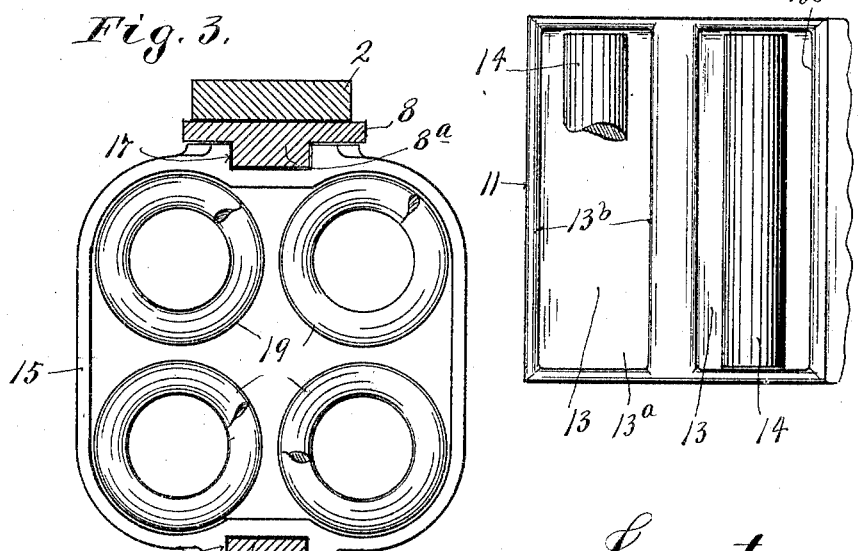

No. 784,096. PATENTED MAR. 7, 1905.
L. W. BARBER.
LATERAL MOTION DEVICE FOR CAR TRUCKS.
APPLICATION FILED OCT. 4, 1904.

3 SHEETS—SHEET 3.

No. 784,096. Patented March 7, 1905.

UNITED STATES PATENT OFFICE.

LEE W. BARBER, OF CHICAGO, ILLINOIS, ASSIGNOR TO STANDARD CAR TRUCK COMPANY, OF CHICAGO, ILLINOIS, A CORPORATION OF NEW JERSEY.

LATERAL-MOTION DEVICE FOR CAR-TRUCKS.

SPECIFICATION forming part of Letters Patent No. 784,096, dated March 7, 1905.

Application filed October 4, 1904. Serial No. 227,094.

*To all whom it may concern:*

Be it known that I, LEE W. BARBER, a citizen of the United States, residing at Chicago, in the county of Cook and State of Illinois, have invented certain new and useful Improvements in Lateral-Motion Devices for Car-Trucks; and I do hereby declare the following to be a full, clear, and exact description of the invention, such as will enable others skilled in the art to which it appertains to make and use the same.

My invention relates to car-trucks, and has for its object to improve the construction of the so-called "lateral-motion devices" therefor.

The invention consists of the novel devices and combinations of devices hereinafter described, and defined in the claims.

In the so-called "Barber lateral-motion trucks," which are now in extensive use throughout the United States and elsewhere, the truck-bolsters are mounted for limited movements transversely of the truck, thereby permitting lateral movements of the car-body with respect to the trucks, such lateral movements being permitted by lateral-motion devices comprising upper and lower roller-bearings and interposed bearing-rollers. As constructed prior to my present invention these roller-bearings have been formed with cylindrical roller-seats, the concave surfaces of which directly engage the said rollers. In trucks wherein a lateral motion not greatly in excess of one inch is required these cylindrical seats have been found to work in a satisfactory manner. It is, however, incident to these cylindrical seats that the rollers and the bearing resting thereon will be given an accelerated rise under movements of the truck-bolster in either direction away from an intermediate normal position. Otherwise stated, when the rollers rest in the deepest portions of the cylindrical seats or in the close vicinity thereof transverse movements of the truck-bolster will cause the rollers to rise very slowly, while the same amount of transverse movement imparted to the truck-bolster when the rollers are near the extremities of the cylindrical seats will cause the rollers to rise relatively at a very rapid rate and under correspondingly-increased resistance.

There is a growing demand in railway service for very long cars, and these long cars have been found to require as much and sometimes more than four inches lateral movement of the car-body with respect to the trucks. To increase or extend in length the cylindrical seats in the bearings, so as to give this increased amount of lateral movement, would require one of two things—to wit, either that said seats be given extension of curve such that the rise of the rollers at the extremities thereof will be too great or that the curve of the seats be made of such large radius that at the intermediate portions thereof there will be too little rise, and hence a very slight tendency to maintain the rollers in central or intermediate positions with respect to said seats. As is evident, the said seats should act upon the rollers to resist lateral movements thereof from their intermediate centered position with sufficient force to maintain considerable stability between the parts. Otherwise stated, the lateral-motion devices are intended to permit lateral movement of the car-body with respect to the trucks, or vice versa, and relieve the same from strains only when considerable force becomes active tending to produce such relative movements.

All of the above-noted limitations I remove by my present invention, which consists in forming the depressed roller-seats in the upper and lower roller-bearings with flat bearing-surfaces that deviate or incline from horizontal planes at the proper angle to offer the desired resistance to movements of the bearing-rollers, and hence of the truck-bolsters and car-body, from their normal intermediate positions. With this construction it results that for all positions of the rollers a given amount of transverse movement of the car-body with respect to the trucks or with respect to the truck-wheels will cause the same amount of rise of the rollers, and consequently such movements will take place under a constant resistance as distinguished from an accelerated resistance, such as afforded by the cylindrical seats above noted. It therefore also follows that the amount of lateral movement which may be permitted to the car-body and bolsters is in no wise limited by the form of the roller-bearing seats and may be increased to any extent found desirable or practicable, other things being considered.

In the accompanying drawings, which illustrate my invention, like characters indicate like parts throughout the several views.

Figure 5:
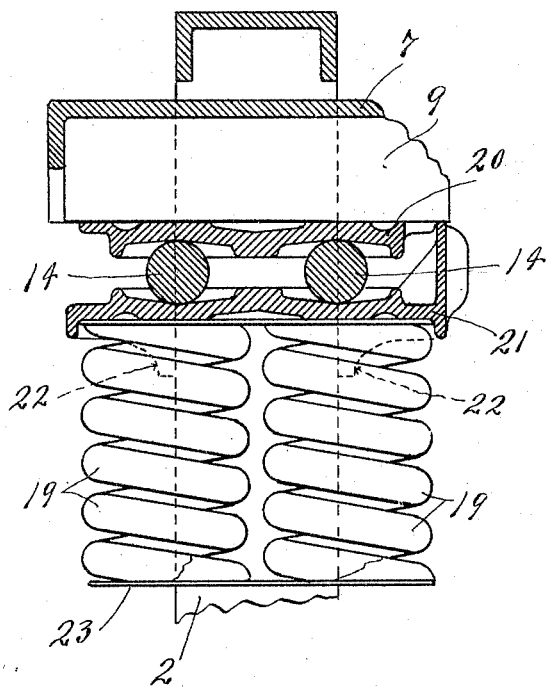

Figure 1 is a view in side elevation with some parts broken away, showing a car-truck equipped with my improved lateral-motion devices. Fig. 2 is a transverse vertical section taken approximately on the line $x^2\ x^2$ of Fig. 1, some parts being broken away and some parts being shown in full. Fig. 3 is a horizontal section on the line $x^3\ x^3$ of Fig. 2. Fig. 4 is a detail view in plan, showing one of the lower roller-bearings or roller-bases and a pair of rollers seated thereon, some parts being broken away; and Fig. 5 is a view corresponding to Fig. 2, but illustrating a modified arrangement of the roller-bearing devices.

The numeral 1 indicates one of the trussed side frames of the truck and in which, as shown, the upper arch-bar at its intermediate portion is bent downward at 2 to afford bolster-columns. The gap left in the upper arch of the trussed side frame by the downwardly-bent yoke 2 thereof is spanned by a thrust-resisting bridge or tie-bar 3, which is bolted thereto at 4. The above construction briefly indicated while novel is not herein claimed, the same being more fully set forth and broadly claimed in my copending application, Serial No. 230,305, filed of date October 28, 1904, entitled "Car-truck." Hence it will be understood that so far as my present invention is concerned the truck may take various forms.

The numeral 5 indicates angle-transoms which, as shown, are riveted to the column-forming sections 2 of the upper arch-bar. Also, as shown, the numeral 6 indicates a saddle-plate which is seated on that portion of the upper trussed bar which connects the lower extremities of the bolster-column-forming sections 2 and is bolted to the lower bars of the frame and is rigidly secured by rivets or otherwise to the transoms 5.

The numeral 7 indicates the truck-bolster, which in the construction illustrated in Figs. 1 to 4, inclusive, is provided at its ends with depending chafing-plates 8, formed on their inner faces with heavy vertical guide-ribs $8^a$. As is usual, shimming-blocks 9 are seated in the ends of the bolster and are provided on their lower faces, as shown, with thin metallic facing-plates 10.

Still referring to the construction illustrated in Figs. 1 to 4, inclusive, the lower roller-bearing or roller-base 11 is seated on the saddle-plate 6 and on the horizontal flanges of the transoms 5 and, as shown, is held against sliding movements by flanges 12 on said saddle-plate that engage end flanges of said bearing. The roller-bearing seats, of which, as shown, the bearing or base 11 is provided with two, are indicated by the numeral 13, and, as already stated, they are formed with flat diverging bearing-surfaces $13^a$. These flat bearing-surfaces $13^a$ from the intermediate or central portions of the seats diverge upward from a horizontal plane and at a constant angle thereto. At the extremities of the seats 13 the bearing 11 is formed with abrupt shoulders $13^b$, that afford positive stops for the bearing-rollers 14, which rest in the said seats.

The upper roller-bearing 15 in the construction at present under consideration affords a combined "roller-cap and spring-base" 15, which rests upon the rollers 14 and is provided with inverted concave roller-seats 16. The roller-seats 16, like the roller-seats 13 of the lower bearing 11, are formed with flat inclined bearing-surfaces $16^a$, that terminate in abrupt stop-shoulders $16^b$. At its sides the combined roller-cap and spring-base 15 is formed with notches or seats 17, that receive the flanges $8^a$ of the bolster chafing-plates 8. The guide-flanges $8^a$ therefore cause said bearing 15 to travel with the bolster transversely of the truck.

The flat bearing-surfaces of the roller-seats instead of being joined at an angle are preferably filled in on the arc of a circle whose diameter is equal to the diameter of the coöperating bearing-roller.

The transverse movement of the bolster is limited in the construction illustrated in Figs. 1 to 4, inclusive, by vertically-projecting stop-lugs 18, formed on the inner extremities of the lower bearings 11 and with which the said bearings 15 engage under their extreme inward movement. Springs 19, of which, as shown, there are four, are interposed between the combined roller-cap and spring-base 15 and the overlying shimming-block 9 in the adjacent end of the bolster.

In the construction illustrated in Fig. 5 the upper roller bearing or cap 20 is directly secured to the shimming-block 9 and the overlying end of the bolster 7 and travels therewith. The lower roller-bearing 21 affords a combined roller-base and spring-cap and is provided with depending guide-lugs 22, that embrace the sides of vertical sections 2 of the upper frame-bar, so that the said bearing 21 is guided for vertical movements thereby. The springs 19 in this construction are interposed between the said roller-bearing 21 and a fixed support 23 on the adjacent side of the truck-frame. The roller-bearing seats formed in the roller-bearings 20 and 21 are the same as those before described and are indicated by the same numerals.

From what has been said it will be understood that the mechanism described is capable of many modifications and different arrangements within the scope of my invention as herein set forth and claimed.

It will of course be understood that the term "bearing-rollers" is used in a sense broad enough to include bearing-balls.

What I claim, and desire to secure by Letters Patent of the United States, is as follows:

1. A lateral-motion device for trucks, comprising upper and lower roller-bearings, and interposed rollers, said roller-bearings having roller-seats formed with flat bearing-surfaces, that diverge from a horizontal plane, and extend from the intermediate portions of said roller-seats, substantially as described.

2. In a car-truck, a lateral-motion device interposed between the truck-frame and the truck-bolster comprising upper and lower roller-bearings, and interposed bearing-rollers, said roller-bearings having roller-seats formed with flat bearing-surfaces, that diverge from a horizontal plane, and extend in opposite directions from the intermediate portions of said roller-seats, substantially as described.

3. In a car-truck, a lateral-motion device and springs, interposed between the truck-bolster and the truck-frame, said lateral-motion device comprising upper and lower roller-bearings, and interposed rollers, one of which bearings is held to move with the truck-bolster, and the other with the truck-frame, said bearings having roller-seats formed with flat bearing-surfaces, that diverge from a horizontal plane, and extend from the intermediate portions of said seats, substantially as described.

4. In a car-truck, the combination with a truck-frame and a truck-bolster, of upper and lower roller-bearings, the former of which is carried transversely of the truck by said bolster, and has a limited vertical movement with respect thereto, and the latter of which is fixed on the truck-frame, and has a stop-lug for intercepting transverse movements of said upper roller-bearing, springs interposed between said upper roller-bearing and the truck-bolster, and bearing-rollers interposed between said upper and lower roller-bearings, said roller-bearings having roller-seats formed with flat bearing-surfaces, that diverge from a horizontal plane, and from the intermediate portions of said seats, and which seats terminate in abrupt stop-shoulders, substantially as described.

In testimony whereof I affix my signature in presence of two witnesses.

LEE W. BARBER.

Witnesses:
 MARTHA HILL,
 F. D. MERCHANT.